US012366169B1

(12) United States Patent
Hall

(10) Patent No.: US 12,366,169 B1
(45) Date of Patent: Jul. 22, 2025

(54) TURBINE BLADE INNER RIB PROFILE

(71) Applicant: GE Infrastructure Technology LLC, Greenville, SC (US)

(72) Inventor: Dallin T Hall, Greenville, SC (US)

(73) Assignee: GE Vernova Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/973,332

(22) Filed: Dec. 9, 2024

(51) Int. Cl.
*F01D 5/18* (2006.01)

(52) U.S. Cl.
CPC ...... *F01D 5/187* (2013.01); *F05D 2220/3212* (2013.01); *F05D 2250/74* (2013.01); *F05D 2260/941* (2013.01)

(58) Field of Classification Search
CPC .......... F01D 5/186; F01D 5/187; F01D 5/188; F01D 5/189; F01D 5/18; F05D 2220/321; F05D 2220/3212; F05D 2220/3213; F05D 2220/3215; F05D 2260/22141; F05D 2260/941; F05D 2250/74; F05D 2260/20; F05D 2260/201; F05D 2260/202
See application file for complete search history.

(56) References Cited

U.S. PATENT DOCUMENTS

| | | | | |
|---|---|---|---|---|
| 6,761,535 | B1 * | 7/2004 | McGrath | F01D 5/147 416/243 |
| 10,544,686 | B2 | 1/2020 | Zemitis et al. | |
| 2005/0084372 | A1 * | 4/2005 | Zhang | F01D 5/18 416/116 |
| 2021/0246792 | A1 * | 8/2021 | Ristau | F04D 29/324 |
| 2024/0159155 | A1 * | 5/2024 | Armstrong | F01D 5/26 |

* cited by examiner

*Primary Examiner* — Christopher Verdier
(74) *Attorney, Agent, or Firm* — James Pemrick; Charlotte Wilson; Hoffman Warnick LLC

(57) ABSTRACT

A turbine blade has an airfoil having a rib separating a portion of an internal space defined between suction and pressure sides and leading and trailing edges into internal channels. The airfoil has a platform. A portion of the rib has a shape having a nominal profile substantially in accordance with Cartesian coordinate values of X, Y and Z set forth in TABLE I. The Cartesian coordinate values are non-dimensional values of from 0% to 100% convertible to distances by multiplying the values by a height of the airfoil expressed in units of distance. The Cartesian coordinate values of X, Y, and Z are connected by smooth continuing arcs to define the nominal profile of the portion of the rib. The rib is positioned between another rib and an inner surface of an airfoil suction sidewall.

15 Claims, 8 Drawing Sheets

TURBINE BLADE INNER RIB PROFILE

TECHNICAL FIELD

The subject matter disclosed herein relates to turbomachines. More particularly, the subject matter disclosed herein relates to an inner rib profile for turbine blades.

BACKGROUND

Some jet aircraft and simple or combined cycle power plant systems employ a gas turbine engine, or a so-called turbomachine, in their configuration and operation. Some of the gas turbine engines employ expansion turbines having one or more stages of turbine blades, which during operation, are exposed to fluid flows at high temperatures and pressures. The turbine blades include airfoils configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. The fluid flow may include hot combustion gases, requiring internal cooling of the airfoil of the turbine blade. Cooling may be provided using, for example, channels defined by various ribs within an internal coolant passage. As a result of the physical and thermal interactions, the structures of the airfoils (e.g., the ribs within the internal coolant passage) are exposed to a variety of stresses that can negatively impact the lifespan of the turbine blades.

BRIEF DESCRIPTION

All aspects, examples and features mentioned below can be combined in any technically possible way.

An aspect of the disclosure includes a turbine blade comprising: an airfoil having: a suction side, a pressure side opposing the suction side, a leading edge, a trailing edge, and a first rib separating a portion of an internal space defined between the suction and pressure sides and the leading and trailing edges into at least two internal channels; and a platform connected with the airfoil along the suction and pressure sides and the leading and trailing edges, the airfoil and the platform including an origin at a junction of the leading edge of the airfoil and the platform; wherein a portion of the first rib has a shape having a nominal profile substantially in accordance with Cartesian coordinate values of X, Y and Z set forth in TABLE I, wherein the Cartesian coordinate values are non-dimensional values of from 0% to 100% convertible to distances from the origin by multiplying the values by a height of the airfoil expressed in units of distance, and wherein the Cartesian coordinate values of X, Y and Z are connected by smooth continuing arcs to define the nominal profile of the portion of the first rib.

Another aspect of the disclosure includes any of the preceding aspects, and the turbine blade includes a first stage blade.

Another aspect of the disclosure includes any of the preceding aspects, and further comprising a fillet connecting a surface of the platform to the airfoil.

Another aspect of the disclosure includes any of the preceding aspects, and the portion of the first rib includes a radially outer portion of the first rib positioned radially inward of a radial outer end of the at least two internal channels.

Another aspect of the disclosure includes any of the preceding aspects, and the first rib extends from a second rib to an inner surface of a suction sidewall of the airfoil, wherein the second rib further separates the portion of the internal space into the at least two internal channels.

Another aspect of the disclosure includes a rotor blade section for a turbine, the rotor blade section comprising: a set of rotating blades, the set of rotating blades including at least one blade having: an airfoil having: a suction side, a pressure side opposing the suction side, a leading edge, a trailing edge, and a first rib within an internal space defined between the suction and pressure sides and the leading and trailing edges, the first rib separating the internal space into at least two internal channels; and a platform connected with the airfoil along the suction and pressure sides and the leading and trailing edges, the airfoil and the platform including an origin at a junction of the leading edge of the airfoil and the platform; wherein a portion of the first rib has a shape having a nominal profile substantially in accordance with Cartesian coordinate values of X, Y and Z set forth in TABLE I, wherein the Cartesian coordinate values are non-dimensional values of from 0% to 100% convertible to distances from the origin by multiplying the values by a height of the airfoil expressed in units of distance, and wherein the Cartesian coordinate values of X, Y and Z are connected by smooth continuing arcs to define the nominal profile of the portion of the first rib.

Another aspect of the disclosure includes any of the preceding aspects, and further comprising a fillet connecting a surface of the platform to the airfoil.

Another aspect of the disclosure includes any of the preceding aspects, and the rotor blade section is a first stage blade section.

Another aspect of the disclosure includes any of the preceding aspects, and the portion of the first rib includes a radially outer portion of the first rib positioned radially inward of a radial outer end of the at least two internal channels.

Another aspect of the disclosure includes any of the preceding aspects, and the first rib extends from a second rib to an inner surface of a suction sidewall of the airfoil, wherein the second rib further separates the portion of the internal space into the at least two internal channels.

Another aspect of the disclosure includes a turbine comprising a plurality of turbine blades in a rotor blade section, at least one of the plurality of turbine blades comprising: an airfoil having: a suction side, a pressure side opposing the suction side, a leading edge, a trailing edge, and a first rib separating a portion of an internal space defined between the suction and pressure sides and the leading and trailing edges into at least two internal channels; and a platform connected with the airfoil along the suction and pressure sides and the leading and trailing edges, the airfoil and the platform including an origin at a junction of the leading edge of the airfoil and the platform; wherein a portion of the first rib has a shape having a nominal profile substantially in accordance with Cartesian coordinate values of X, Y and Z set forth in TABLE I, wherein the Cartesian coordinate values are non-dimensional values of from 0% to 100% convertible to distances from the origin by multiplying the values by a height of the airfoil expressed in units of distance, and wherein the Cartesian coordinate values of X, Y and Z are connected by smooth continuing arcs to define the nominal profile of the portion of the first rib.

Another aspect of the disclosure includes any of the preceding aspects, and further comprising a fillet connecting a surface of the platform to the airfoil.

Another aspect of the disclosure includes any of the preceding aspects, and each turbine blade includes a first stage blade.

Another aspect of the disclosure includes any of the preceding aspects, and the portion of the first rib includes a radially outer portion of the first rib positioned radially inward of a radial outer end of the at least two internal channels.

Another aspect of the disclosure includes any of the preceding aspects, and the first rib extends from a second rib to an inner surface of a suction sidewall of the airfoil, wherein the second rib further separates the portion of the internal space into the at least two internal channels.

Two or more aspects described in this summary section may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
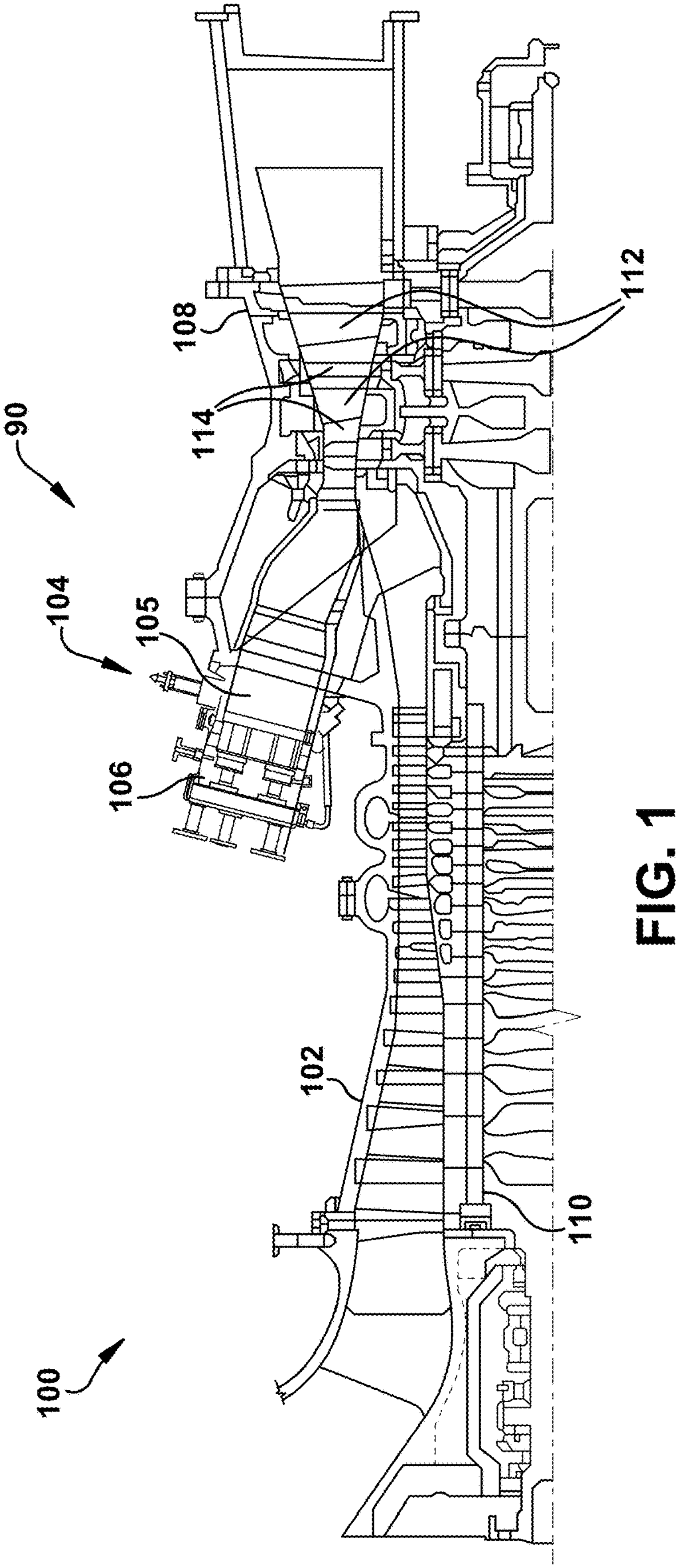
FIG. 1 is a simplified cross-sectional view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, “downstream” and “upstream” are terms that indicate a direction relative to the flow of a fluid, such as the working fluid through the turbine engine or, for example, the flow of air through the combustor or coolant through one of the turbine’s component systems. The term “downstream” corresponds to the direction of flow of the fluid, and the term “upstream” refers to the direction opposite to the flow. The terms “forward” and “aft,” without any further specificity, refer to directions, with “forward” referring to the front or compressor end of the engine, and “aft” referring to the rearward or turbine end of the engine.

It is often required to describe parts that are disposed at different radial positions with regard to a center axis. The term “radial” refers to movement or position perpendicular to an axis. For example, if a first component resides closer to the axis than a second component, it will be stated herein that the first component is “radially inward” or “inboard” of the second component. If, on the other hand, the first component resides further from the axis than the second component, it may be stated herein that the first component is “radially outward” or “outboard” of the second component. The term “axial” refers to movement or position parallel to an axis. Finally, the term “circumferential” refers to movement or position around an axis. It will be appreciated that such terms may be applied in relation to the center axis of the turbomachine.

In addition, several descriptive terms may be used regularly herein, as described below. The terms “first”, “second”, and “third” may be used interchangeably to distinguish one component from another and are not intended to signify location or importance of the individual components.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components but do not preclude the presence or addition of one or more other features, integers, steps, operations, elements, components, and/or groups thereof. “Optional” or “optionally” means that the subsequently described feature or element may or may not be present and that the description includes instances where the feature is present and instances where it is not.

Where an element or layer is referred to as being “on,” “engaged to,” “connected to” or “coupled to” another element or layer, it may be directly on, engaged to, connected to, or coupled to the other element or layer, or intervening elements or layers may be present. In contrast, when an element is referred to as being “directly on,” “directly engaged to," "directly connected to" or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine blades that rotate (hereinafter, "blade" or "turbine blade"). A turbine blade may include an airfoil having: a suction side, a pressure side opposing the suction side, a leading edge and a trailing edge. The airfoil may also include a rib separating a portion of an internal space defined between the suction and pressure sides and the leading and trailing edges into at least two internal channels. The turbine blade may also include a platform connected with the airfoil along the suction and pressure sides and the leading and trailing edges, i.e., as part of a root of the turbine blade. The airfoil and the platform include an origin at a junction of the leading edge of the airfoil and the platform. A portion of the rib has a shape having a nominal profile substantially in accordance with Cartesian coordinate values of X, Y and Z set forth in TABLE I. The Cartesian coordinate values are non-dimensional values of from 0% to 100% convertible to distances from the origin by multiplying the values by a height of the airfoil expressed in units of distance. The X and Y values connected by smooth continuing arcs define rib profile sections at each distance Z along the portion of the rib. The profile sections at the Z distances are joined smoothly with one another to form the nominal profile. The portion of the rib defined by the profile herein is adjacent an inner surface of a suction sidewall of the airfoil and in closer proximity to the leading edge than the trailing edge. The rib provides discrete regions of varying thickness and optimized filleting to reduce stress near turns between channels on either side of the rib. More particularly, the rib includes a complex fillet shape along a turn thereof that separates two internal channels.

Referring to the drawings, FIG. 1 is a schematic view of an illustrative non-limiting turbomachine 90 in the form of a combustion turbine or gas turbine (GT) system 100 (hereinafter, "GT system 100"). GT system 100 includes a compressor 102 and a combustor 104. Combustor 104 includes a combustion region 105 and a fuel nozzle assembly 106. GT system 100 also includes a turbine 108 (e.g., an expansion turbine) and a common rotor compressor/turbine shaft 110 (hereinafter referred to as "rotor shaft 110").

In one non-limiting embodiment, GT system 100 is a 7HA.03 engine, commercially available from GE Vernova, Cambridge, MA, USA. The present disclosure is not limited to any one particular GT system 100 and may be implanted in connection with other engines including, for example, the other HA, F, B, LM, GT, TM and E-class engine models of GE Vernova, and engine models of other companies. Further, the teachings of the disclosure are not necessarily applicable to only a GT system and may be applied to other types of turbomachines, e.g., steam turbines, jet engines, compressors, etc.

Figure 2:
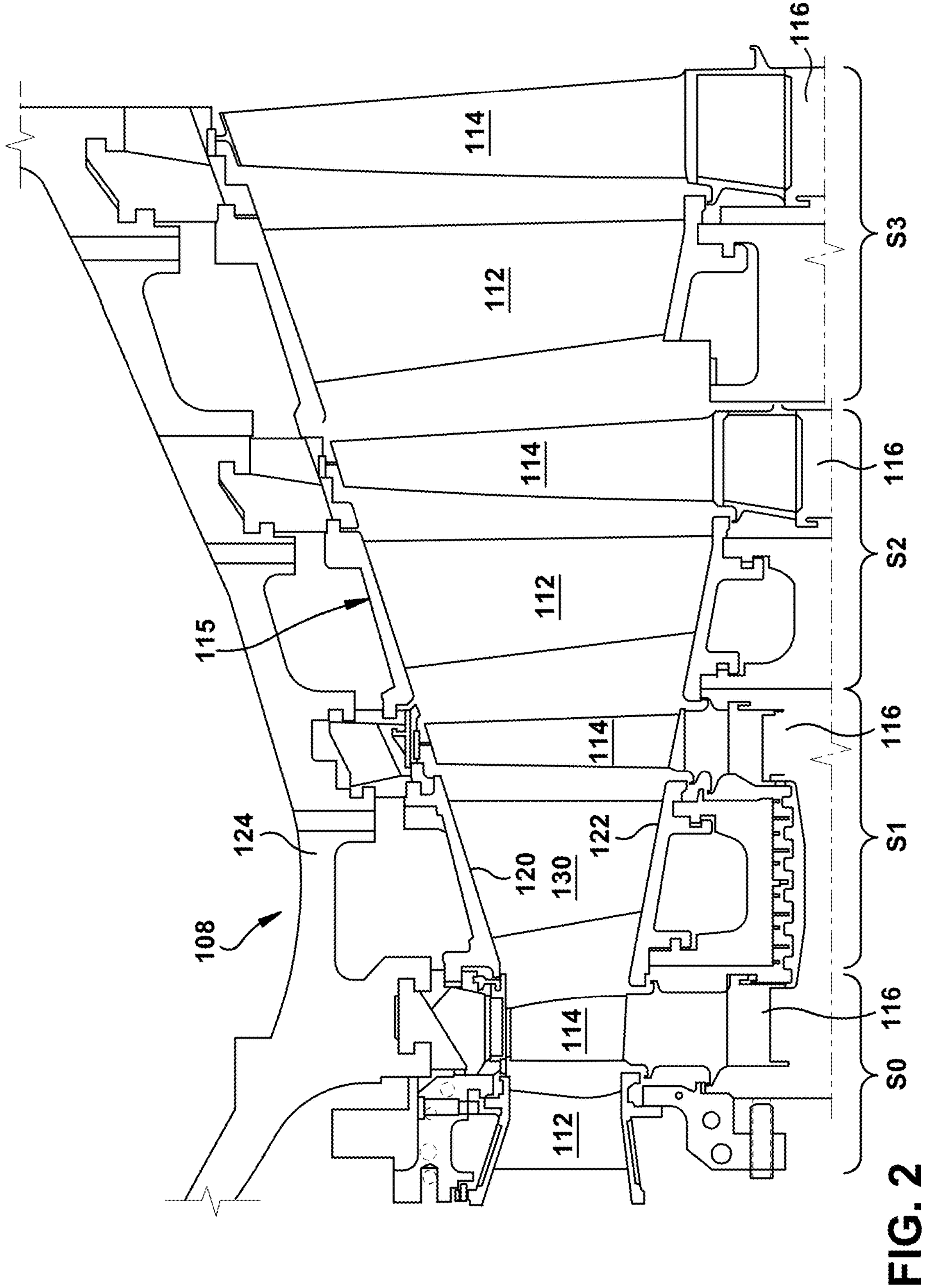
FIG. 2 is a cross-sectional view of an illustrative turbine assembly (e.g., an expansion turbine) with four stages that may be used with the turbomachine in FIG. 1.

FIG. 2 shows a cross-sectional view of an illustrative non-limiting portion of turbine 108 with four stages S0-S3 that may be used with GT system 100 in FIG. 1. The four stages are referred to as S0, S1, S2, and S3. Stage S0 is the first stage and is the smallest (in a radial direction) of the four stages. Stage S1 is the second stage and is the next stage in an axial direction. Stage S2 is the third stage and is the next stage in an axial direction. Stage S3 is the fourth, last stage and is the largest (in a radial direction). It is to be understood that four stages are shown as one non-limiting example only, and each turbine may have more or less than four stages.

A set of stationary vanes or nozzles 112 cooperate with a set of rotating blades 114 to form each stage S0-S3 of turbine 108 and to define a portion of a flow path through turbine 108. Rotating blades 114 in each set are coupled to a respective rotor wheel 116 that couples them circumferentially to rotor shaft 110 (FIG. 1). That is, a plurality of rotating blades 114 are mechanically coupled in a circumferentially spaced manner to each rotor wheel 116. A static blade section 115 includes the stationary nozzles 112 circumferentially spaced around rotor shaft 110. Each nozzle 112 may include at least one platform 120, 122 connected with airfoil 130. In the example shown in FIG. 2, nozzle 112 includes a radially outer platform 120 and a radially inner platform 122. Radially outer platform 120 couples nozzle 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor shaft 110. Compressor 102 also is rotatably coupled to rotor shaft 110. In the illustrative embodiment, there is a plurality of combustors 104 and fuel nozzle assemblies 106. In the following discussion, unless otherwise indicated, only one of each component will be discussed. At least one end of rotating rotor shaft 110 may extend axially away from turbine 108 (or compressor 102) and may be attached to a load or machinery (not shown), such as, but not limited to, a generator, a load compressor, and/or another turbine.

Figure 3:
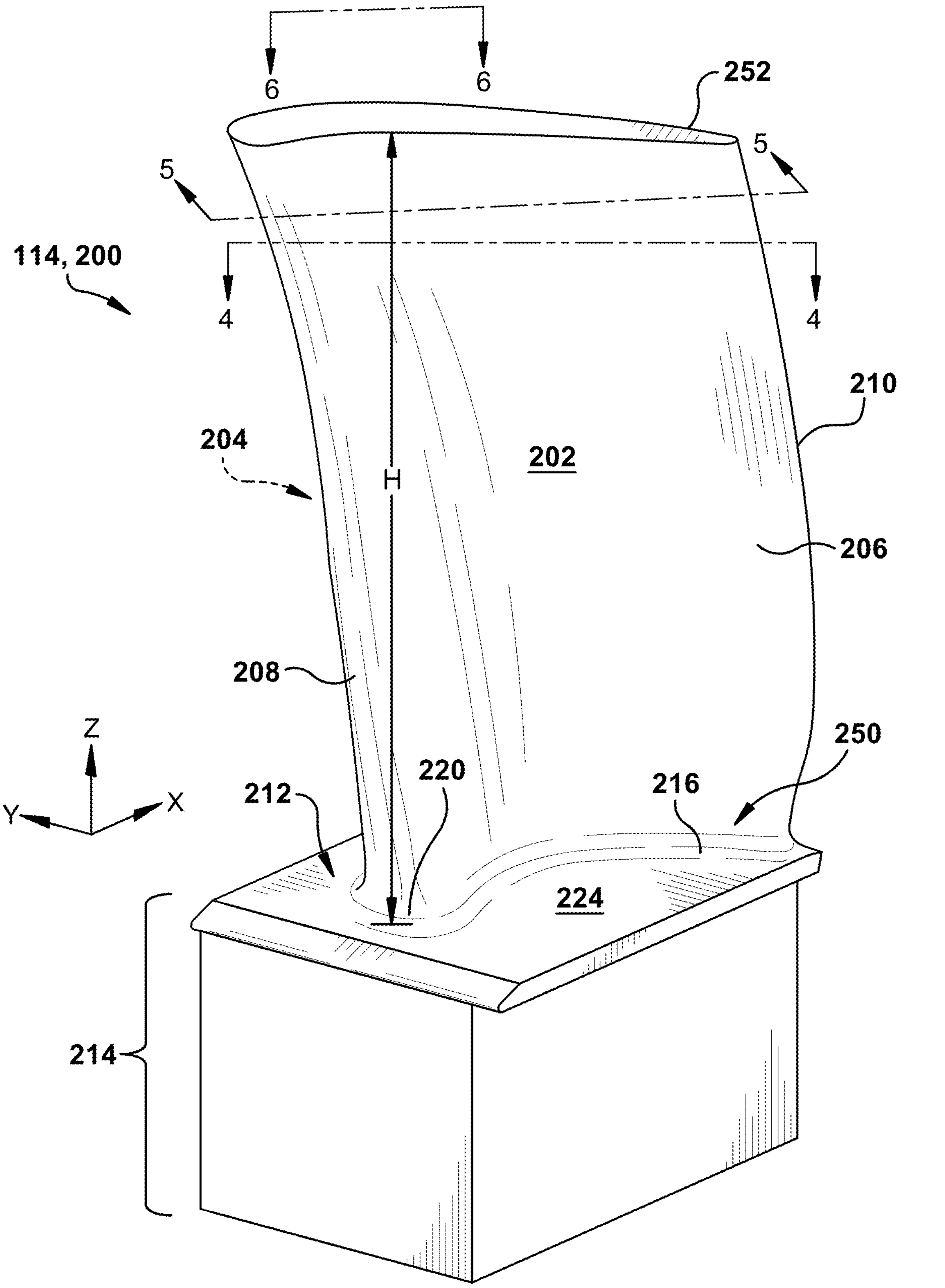
FIG. 3 is a schematic three-dimensional view of an illustrative turbine blade including an unshrouded airfoil, according to various embodiments of the disclosure.

FIG. 3 illustrates a blade 200 that can be used as a turbine rotor blade 114 (FIG. 2). Blade 200 is a rotatable (dynamic) blade, which, as shown in FIG. 2, is part of the set of turbine blades circumferentially dispersed about a rotor shaft in a stage of a turbine (e.g., turbine 108). That is, during operation of turbine, as a working fluid (e.g., gas or steam) is directed across the blade's airfoil, blade 200 will initiate rotation of rotor shaft 110 and rotate about an axis defined by rotor shaft 110. It is understood that blade 200 is configured to couple (mechanically couple via fasteners, welds, slot/grooves, etc.) with a plurality of similar or distinct blades (e.g., blades 200 or other blades) to form a set of blades in a stage of the turbine 108 (e.g., stage S0 in FIG. 2).

With reference to FIG. 3, turbine blade 200 can include an airfoil 202 having a suction side 204 (partially obstructed in this view) and a pressure side 206 opposing suction side 204. Blade 200 can also include a leading edge 208 spanning between pressure side 206 and suction side 204, and a trailing edge 210 opposing leading edge 208 and spanning between pressure side 206 and suction side 204. Leading edge 208 is defined as an edge or line at which combustion flow diverges to pass over or by pressure side 206 or suction side 204.

As shown, blade 200 can also include a platform 212 connected at a radial inner end 250 of airfoil 202 and a tip end 252 on an opposite end of airfoil 202. In FIG. 3, tip end 252 is shown without a tip shroud. Platform 212 is part of a root 214. Root 214 is illustrated as a "block" in FIG. 3 for ease of depiction and description, but root 214 can have any suitable configuration to connect to rotor shaft 110 (FIG. 1). Platform 212 can be connected with airfoil 202 along suction side 204, pressure side 206, trailing edge 210 and leading edge 208. In various embodiments, blade 200 includes a fillet 216 proximate a radial inner end 250 of airfoil 202. Fillet 216 connects airfoil 202 and platform 212 (e.g., at a surface 224 of platform 212). Fillet 216 can include a weld or braze fillet, which may be formed via conventional MIG welding, TIG welding, brazing, etc. Fillet 216 can include such forms as integral to the investment casting process or definition. Parts of root 214 are configured to fit into a mating slot in rotor shaft 110 (FIG. 1) and to mate with adjacent components of other blades 200. Platform 212 is intended to be located radially inboard of airfoil 202 and be formed in any complementary configuration to the rest of root 214. Airfoil 202 and platform 212 include an origin 220 at a junction of leading edge 208 of airfoil 202 and platform 212, i.e., at a junction between platform 212 and airfoil 202.

With reference again to FIGS. 2 and 3, in various non-limiting embodiments, blade 200 can include a first stage (S0) blade, a second stage (S1) blade, a third stage (S2) blade, or a fourth stage (S3) blade. In particular embodiments, blade 200 is a first stage (S0) blade. In various embodiments, turbine 108 can include a set of blades 200 in only the first stage (S0) of turbine 108, or in only second stage (S3), or in only third stage (S2), or in only fourth stage (S3) of turbine 108.

Figure 4:
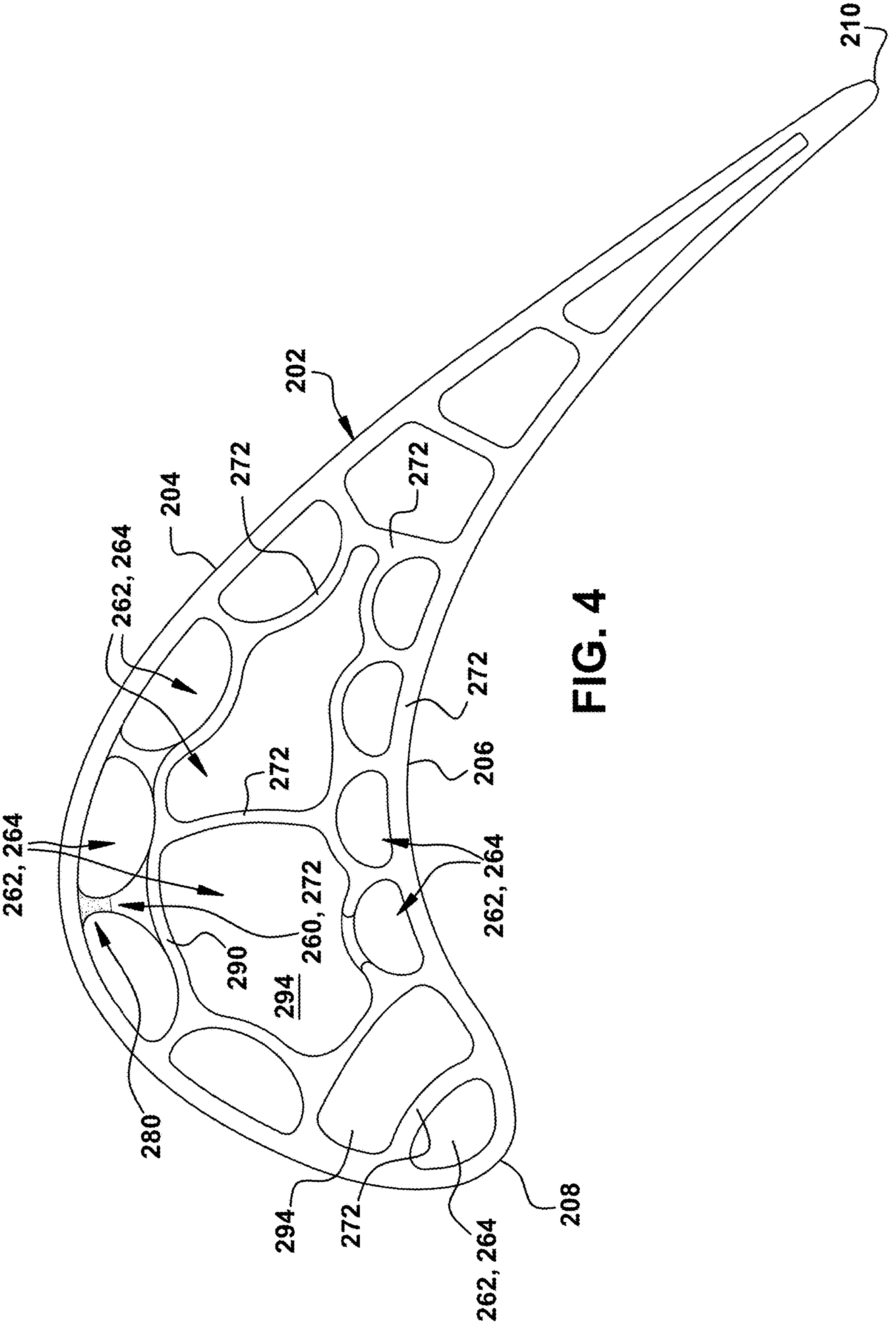
FIG. 4 is an axial cross-sectional view, taken along view line 4-4 in FIG. 3, of an airfoil including a rib having a profile, according to various embodiments of the disclosure.
Figure 5:
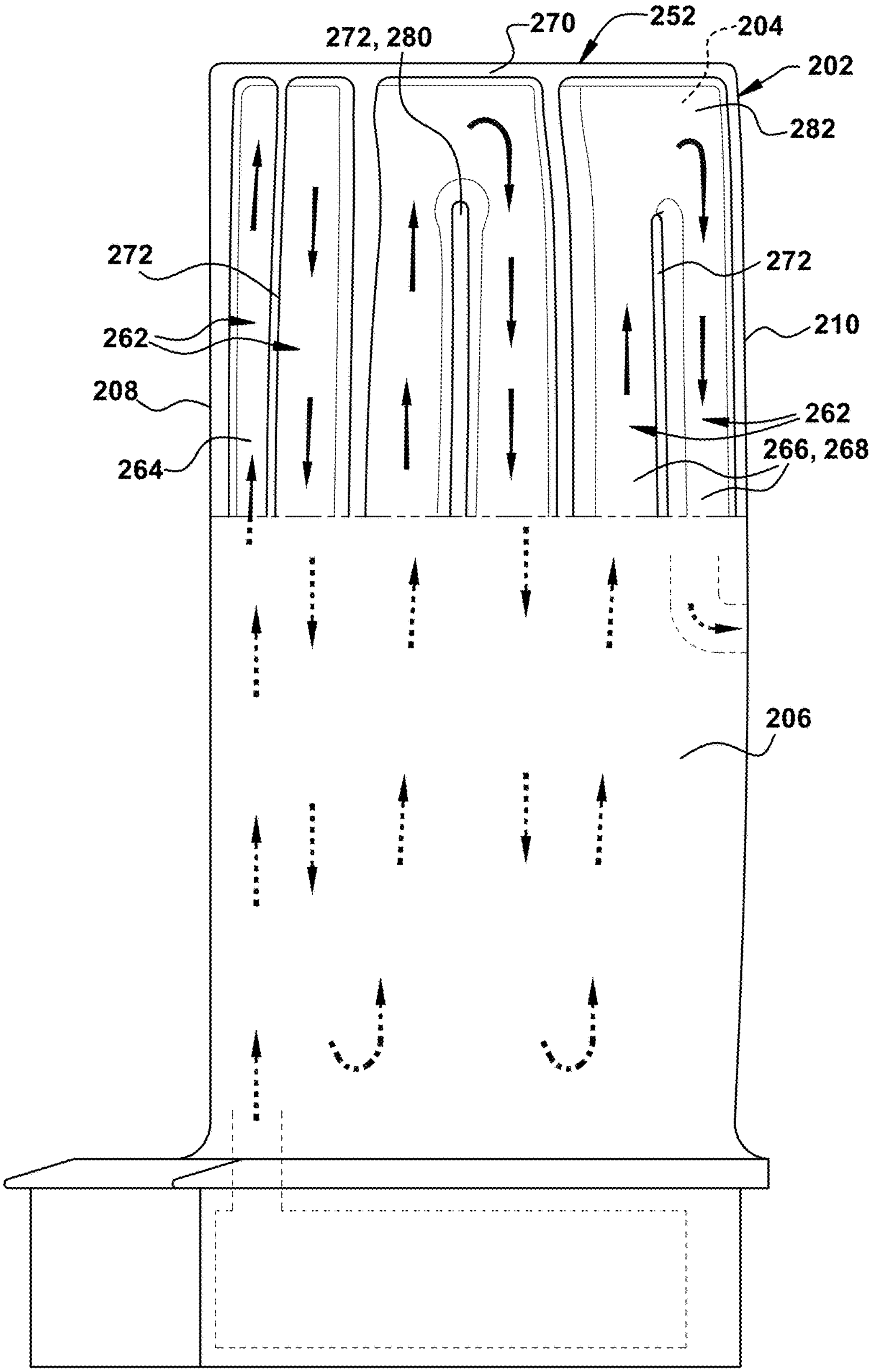
FIG. 5 is a radial, schematic cross-sectional view, taken along view line 5-5 in FIG. 3, of an airfoil including a rib having a profile, according to various embodiments of the disclosure.
Figure 6:
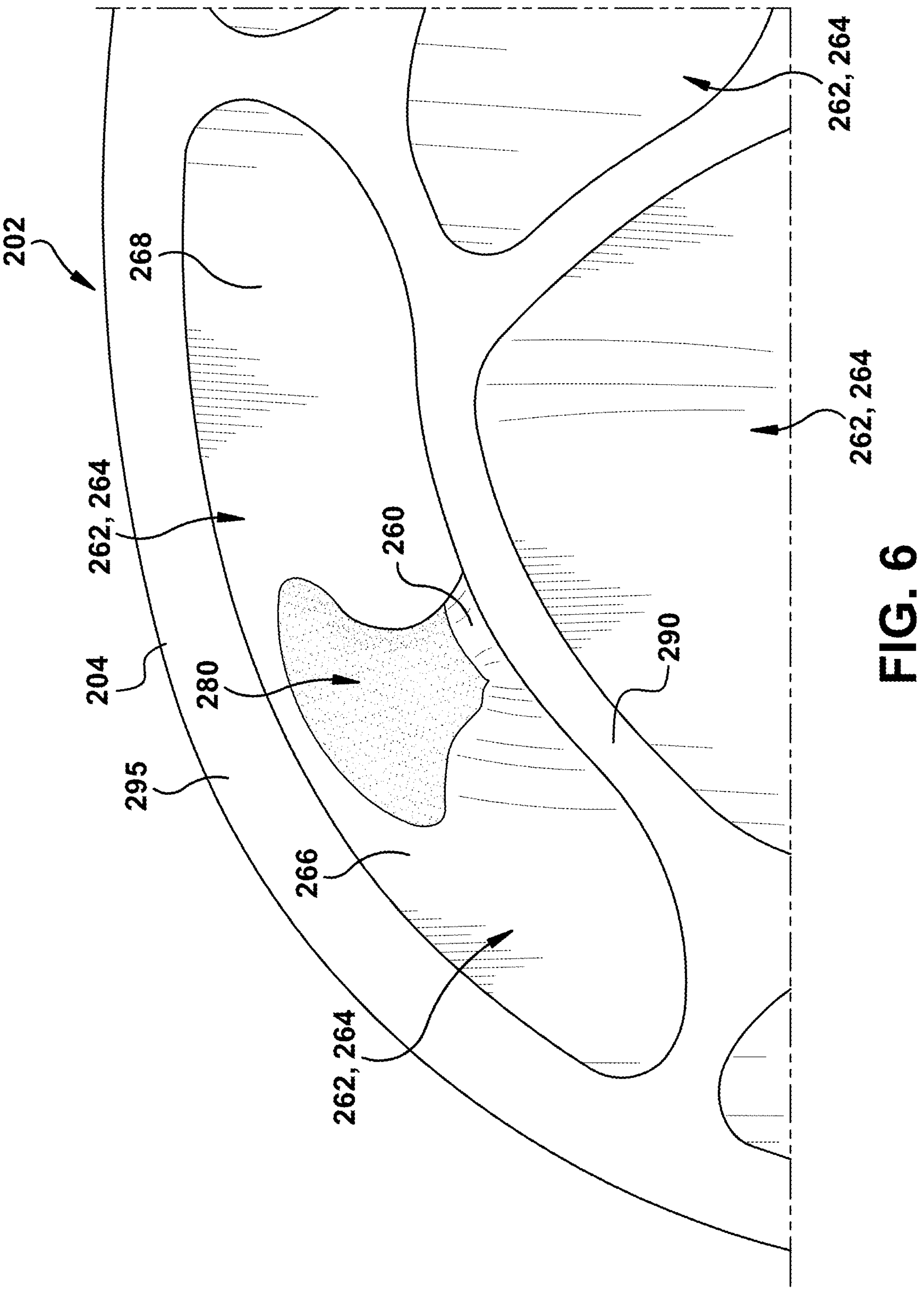
FIG. 6 is an enlarged cross-sectional view, taken along view line 6-6 in FIG. 3, of a suction side portion of an airfoil including a rib having a profile, according to various embodiments of the disclosure.
Figure 7:
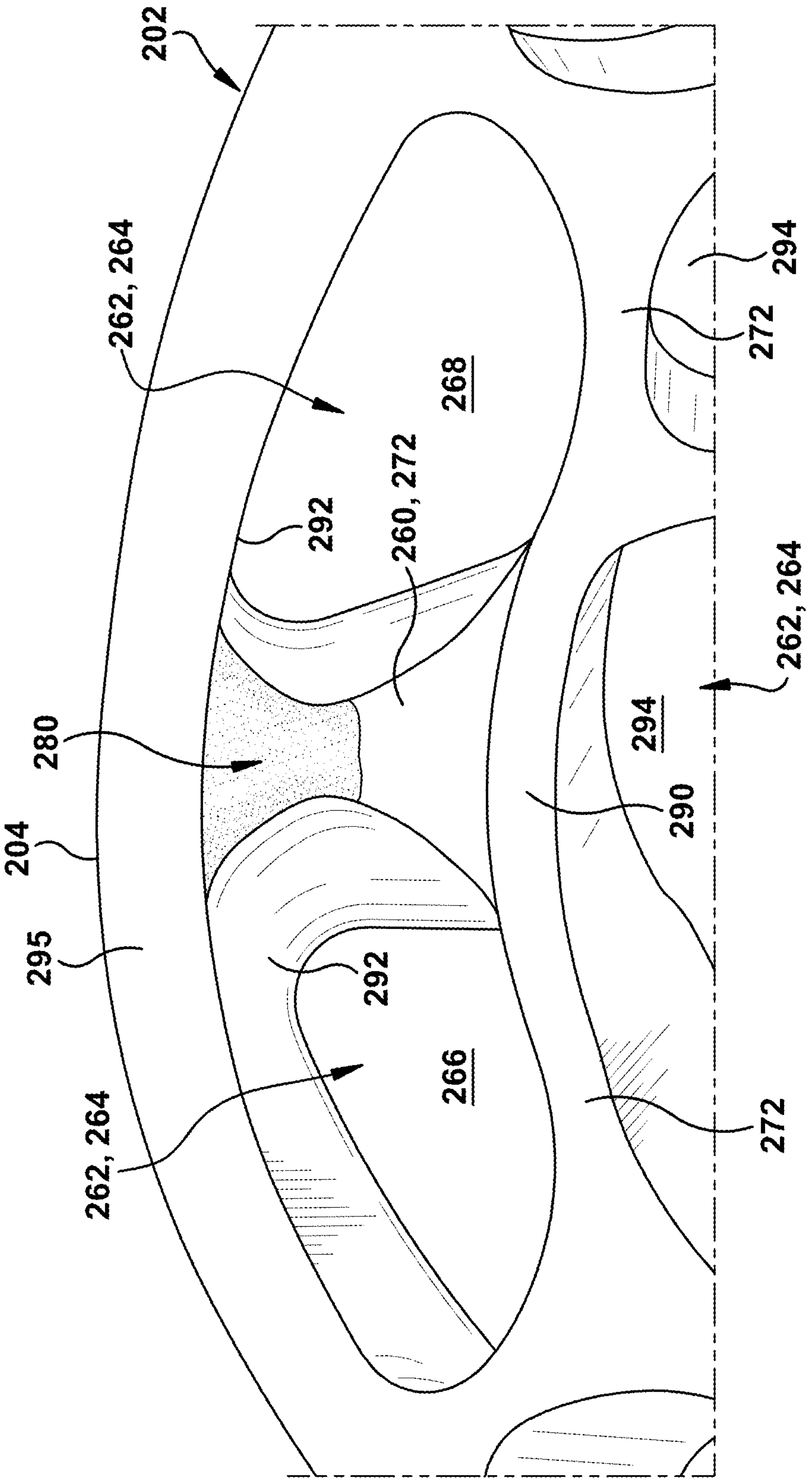
FIG. 7 is an enlarged top-down, cross-sectional view of an airfoil including a rib having a profile, according to various embodiments of the disclosure.

FIG. 4 shows an axial cross-sectional view of airfoil 202, taken along view line 4-4 in FIG. 3, and FIG. 5 shows a radial, schematic cross-sectional view of airfoil 202, taken along view line 5-5 in FIG. 3. FIG. 6 shows an enlarged cross-sectional and perspective view of airfoil 202 generally taken along view line 6-6 in FIG. 3 of a suction side portion including a rib 260, according to embodiments of the disclosure. FIG. 7 shows an enlarged top-down, cross-sectional view, and FIG. 8 shows an enlarged side cross-sectional view of airfoil 202 including rib 260 having a profile, according to various embodiments of the disclosure.

With reference to FIGS. 3-5, an internal space 262 of airfoil 202 is defined collectively within suction side 204, pressure side 206, leading edge 208 and trailing edge 210. Internal space 262 provides an internal coolant passage 264 that delivers coolant through airfoil 202 to cool airfoil 202. Coolant (arrows in FIG. 5) can be delivered to airfoil 202 in any now known or later developed fashion, e.g., through passages in root 214 in fluid communication with an outlet of compressor 102 (FIG. 1). As shown in FIGS. 5 and 8, internal space 262 and internal coolant passage 264 may terminate at a tip plate 270 that defines part of tip 252 of airfoil 202. Internal space 262 is separated into at least two channels 266, 268 by any number of ribs 272, of which rib 260 according to embodiments of the disclosure, is one.

As shown in FIG. 5, any number of ribs 272 may extend from radial inner end 250 of airfoil 222 and terminate prior to tip plate 270, and any number of ribs 272 may extend from tip 252 of airfoil 202 and terminate prior to, for example, root 214. Ribs 272 may thus form channels 266, 268 for directing coolant through a serpentine cooling passage in which coolant is directed in a radial inward direction and then is directed in a radial outward direction depending on their location in airfoil 202. More particularly, various ribs 272, of which rib 260 is one, separate portions of internal space 262 defined between suction side 204 and pressure side 206 and leading edge 208 and trailing edge 210 into at least two internal channels 266, 268. Other ribs 272 may define additional internal channels 294. Ribs 272 may define a series of adjacent cooling channels 264 along suction side 204 and pressure side 206 as "near-wall" cooling channels. Terminal ends of certain ribs 272 present challenging stress areas that can negatively impact a lifespan of turbine blade 200 (FIG. 3).

Figure 8:
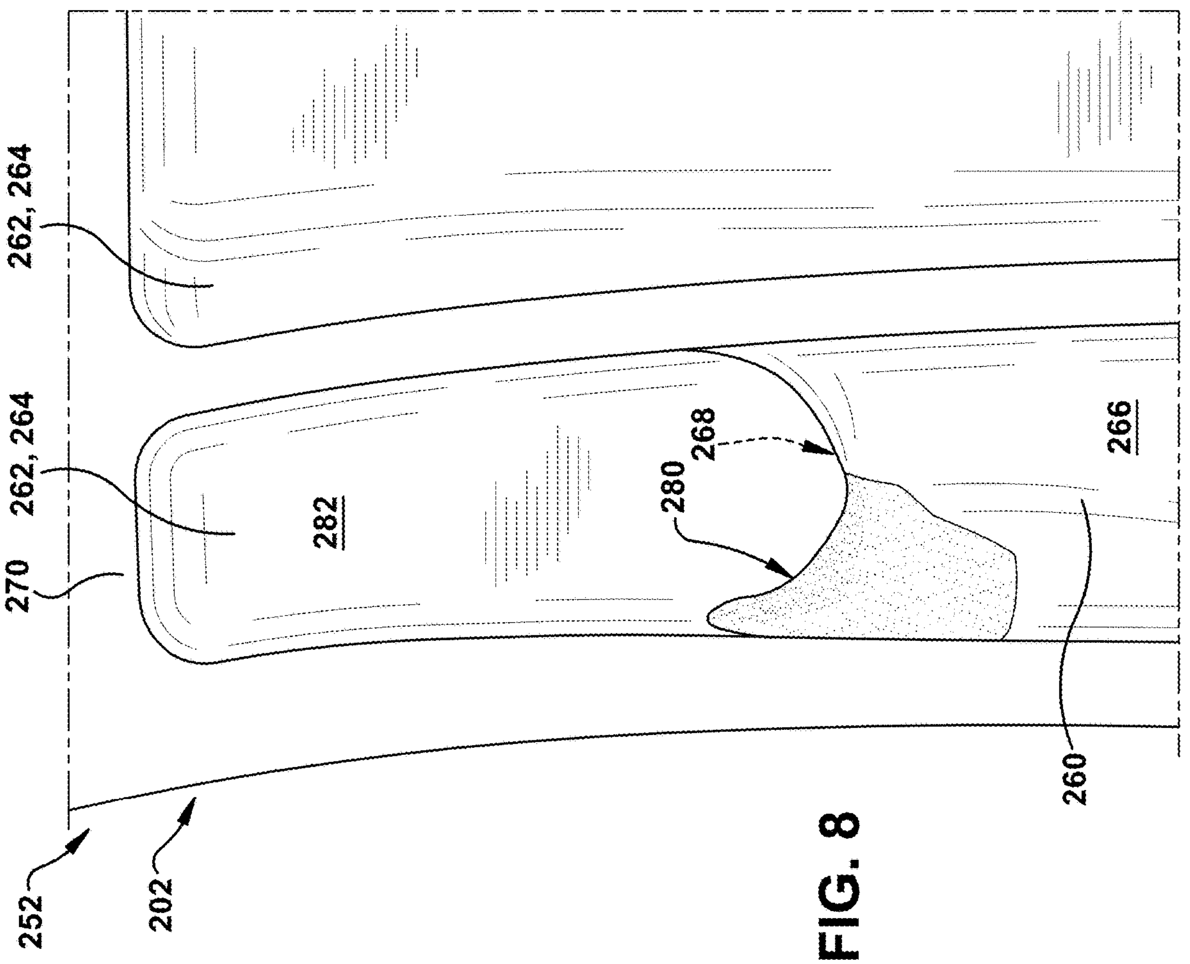
FIG. 8 is an enlarged side cross-sectional view of an airfoil including a rib having a profile, according to various embodiments of the disclosure.

FIGS. 6-8 show a portion 280 of rib 260 (highlighted in FIGS. 6-8 and referred to hereafter as "rib portion 280") having a shape having a nominal profile substantially in accordance with the Cartesian coordinate values of X, Y and Z set forth in TABLE I below. Rib portion 280 includes a radially outer portion of rib 260 positioned radially inward of a radial outer end 282 (FIG. 8) of at least two internal channels 266, 268 formed by rib 260, i.e., within tip plate 270. Hence, coolant can flow from one of near-wall channels 266, 268, over rib 260 and rib portion 280, and into an adjacent near-wall channel 268, 266.

In the example shown, (first) rib 260 extends from a (second) rib 290 to an inner surface 292 of a suction sidewall 295 of airfoil 202, and near-wall channels 266, 268 are disposed along suction sidewall 295. Second rib 290, at least a portion of which is inboard of suction sidewall 295, may further separate (or help to separate) the portion of internal space 262 into other internal channels, e.g., 294. For example, rib 260 with rib portion 280 may have a terminal edge in contact with suction sidewall 295 and an opposite terminal edge in contact with centrally disposed rib 290. Rib portion 280 of rib 260 extends from suction sidewall 295 toward a midpoint of rib 260 (i.e., a midpoint between suction sidewall 295 and rib 290).

The nominal shape of rib portion 280 is configured to reduce stresses experienced by rib 260 and increase a lifespan of turbine blade 200 (FIG. 3). Rib portion 280 may have a profile or shape as defined by the coordinate values. Rib portion 280 is shown in FIGS. 6 and 8 including a plurality of dots that correspond to X, Y and Z coordinate values. Each dot can be described by a respective set of X, Y and Z coordinate values. For example, the coordinates in TABLE I can be provided to define each dot. Note, the number of dots shown in the drawings does not necessarily match with the values in TABLE I.

The Cartesian coordinate values are expressed in normalized or non-dimensionalized form in values of from 0% to 100% (percentages), but it should be apparent that any or all of the coordinate values could instead be expressed in distance units so long as the percentages and proportions are maintained. To convert an X, Y or Z value of TABLE I to a respective X, Y or Z coordinate value in units of distance, such as inches or centimeters, the non-dimensional X, Y or Z value given in TABLE I can be multiplied by an airfoil height H of airfoil 202 in such units of distance. "Airfoil height" H is defined as a radial distance from origin 220 to a location of tip 252 thereover. Representative heights of airfoil 202 may range from about 5.0 inches (~12.7 centimeters (cm)) to about 12.0 inches (~30.48 cm). In a particular embodiment of an S0 blade for a GE Vernova 7HA.03 heavy-duty gas turbine engine, the height H of airfoil 202 may be about 7.89 inches (~20.04 cm).

By connecting the X, Y, and Z data points smoothly with one another (with lines and/or arcs), a surface profile for rib portion 280 may be formed using any now known or later developed curve fitting technique to generate a curved surface appropriate for, for example, an airfoil. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The values in TABLE I are non-dimensionalized percentages generated and shown to three decimal places for determining the nominal profile of rib portion 280 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I, particularly to the X and Y values therein. For example, a tolerance of about 10-20 percent of a minimum thickness of rib portion 280 in a direction normal to any surface location along rib portion 280 can define rib portion 280 profile envelope for rib portion design at cold or room temperature. In other words, a distance of about 10-20 percent of a minimum thickness of rib portion 280 in a direction normal to any surface location thereof can define a range of variation between measured points on an actual rib portion 280 and ideal positions of those points, particularly at a cold or room temperature, as embodied by the disclosure. The rib portion 280 configuration, as embodied herein, is robust to this range of variation without impairment of mechanical and aerodynamic functions.

Likewise, the profile and/or configuration can be scaled up or down, such as geometrically, without impairment of operation. Such scaling can be facilitated by multiplying the normalized/non-dimensionalized percentage values by a common scaling factor, which may be a larger or smaller number of distance units than might have originally been used for rib 272 of a given height airfoil 202. For example, the non-dimensionalized percentage values in TABLE I, particularly the X and Y values, could be multiplied uniformly by a scaling factor of 2, 0.5, or any other desired scaling factor. In various embodiments, the X, Y, and Z distances are scalable as a function of the same constant or number to provide a scaled up or scaled down rib portion 280. Alternatively, the values could be multiplied by a larger or smaller desired airfoil height H. As referenced herein, origin 220 of the X, Y, Z coordinate system is the leading edge junction of airfoil 202 with surface 224 of platform 212.

Where a Z value is used that is not expressly listed in TABLE I, the corresponding X and Y values can be identified through extrapolation. For example, if a Z layer is required at 87%, then the X value at 80% plus 0.7 times (70% of) the difference between the X value at 80% and 90%, can be used. Similarly, the Y value at 80% plus 0.7 times (70% of) the difference between the Y value at 80% and 90%, can be used. Other extrapolation processes can also be employed.

TABLE I

[non-dimensionalized percentage]

| N | X | Y | Z |
|---|---|---|---|
| 1 | 0.257 | 0.288 | 0.797 |
| 2 | 0.234 | 0.321 | 0.800 |
| 3 | 0.253 | 0.300 | 0.797 |
| 4 | 0.253 | 0.309 | 0.796 |
| 5 | 0.256 | 0.314 | 0.796 |
| 6 | 0.264 | 0.316 | 0.796 |
| 7 | 0.257 | 0.288 | 0.804 |
| 8 | 0.253 | 0.300 | 0.804 |
| 9 | 0.257 | 0.288 | 0.811 |
| 10 | 0.253 | 0.300 | 0.811 |
| 11 | 0.257 | 0.288 | 0.818 |
| 12 | 0.253 | 0.300 | 0.817 |
| 13 | 0.257 | 0.288 | 0.825 |
| 14 | 0.253 | 0.299 | 0.824 |
| 15 | 0.251 | 0.300 | 0.831 |
| 16 | 0.255 | 0.289 | 0.833 |
| 17 | 0.250 | 0.290 | 0.837 |
| 18 | 0.245 | 0.292 | 0.838 |
| 19 | 0.240 | 0.293 | 0.837 |
| 20 | 0.236 | 0.294 | 0.833 |
| 21 | 0.249 | 0.300 | 0.832 |
| 22 | 0.246 | 0.301 | 0.832 |
| 23 | 0.243 | 0.301 | 0.832 |
| 24 | 0.241 | 0.302 | 0.828 |
| 25 | 0.253 | 0.309 | 0.803 |
| 26 | 0.253 | 0.309 | 0.810 |
| 27 | 0.254 | 0.308 | 0.818 |
| 28 | 0.255 | 0.308 | 0.825 |
| 29 | 0.255 | 0.308 | 0.830 |
| 30 | 0.252 | 0.308 | 0.834 |
| 31 | 0.248 | 0.309 | 0.835 |
| 32 | 0.245 | 0.310 | 0.834 |
| 33 | 0.242 | 0.310 | 0.830 |
| 34 | 0.257 | 0.314 | 0.803 |
| 35 | 0.257 | 0.314 | 0.810 |
| 36 | 0.259 | 0.313 | 0.818 |
| 37 | 0.261 | 0.312 | 0.825 |
| 38 | 0.260 | 0.312 | 0.831 |
| 39 | 0.257 | 0.313 | 0.837 |
| 40 | 0.253 | 0.314 | 0.840 |
| 41 | 0.249 | 0.315 | 0.840 |
| 42 | 0.245 | 0.316 | 0.839 |
| 43 | 0.241 | 0.316 | 0.836 |
| 44 | 0.239 | 0.316 | 0.830 |
| 45 | 0.264 | 0.316 | 0.803 |
| 46 | 0.264 | 0.316 | 0.810 |
| 47 | 0.266 | 0.315 | 0.818 |
| 48 | 0.267 | 0.314 | 0.825 |
| 49 | 0.267 | 0.314 | 0.832 |
| 50 | 0.266 | 0.315 | 0.838 |
| 51 | 0.262 | 0.316 | 0.842 |
| 52 | 0.258 | 0.317 | 0.845 |
| 53 | 0.254 | 0.318 | 0.847 |
| 54 | 0.249 | 0.319 | 0.848 |
| 55 | 0.243 | 0.320 | 0.846 |
| 56 | 0.234 | 0.294 | 0.828 |
| 57 | 0.242 | 0.302 | 0.821 |
| 58 | 0.242 | 0.303 | 0.814 |
| 59 | 0.242 | 0.303 | 0.808 |
| 60 | 0.243 | 0.303 | 0.801 |
| 61 | 0.235 | 0.294 | 0.821 |
| 62 | 0.236 | 0.294 | 0.815 |
| 63 | 0.236 | 0.294 | 0.808 |
| 64 | 0.237 | 0.294 | 0.801 |
| 65 | 0.242 | 0.311 | 0.825 |
| 66 | 0.243 | 0.311 | 0.818 |
| 67 | 0.244 | 0.311 | 0.813 |
| 68 | 0.244 | 0.311 | 0.806 |
| 69 | 0.244 | 0.311 | 0.800 |
| 70 | 0.239 | 0.317 | 0.825 |
| 71 | 0.241 | 0.317 | 0.818 |
| 72 | 0.242 | 0.317 | 0.812 |
| 73 | 0.242 | 0.317 | 0.806 |
| 74 | 0.243 | 0.317 | 0.800 |
| 75 | 0.238 | 0.321 | 0.840 |
| 76 | 0.235 | 0.321 | 0.833 |
| 77 | 0.234 | 0.321 | 0.826 |
| 78 | 0.234 | 0.321 | 0.818 |
| 79 | 0.234 | 0.321 | 0.812 |
| 80 | 0.234 | 0.321 | 0.806 |

The disclosed shape of rib portion 280 provides a unique profile to achieve optimized stress relief at rib 260 to meet performance targets specific to the machine in which rotating blade 200 is used, and perhaps other machines.

Embodiments of the disclosure also include a rotor blade section for a turbine, e.g., a stage, including a set of rotating blades 200 including at least one blade 200 having rib 260 with rib portion 280 as described herein.

Embodiments of the disclosure also include turbine 108 including a plurality of turbine blades 200, as described herein.

Embodiments of the disclosure provide various technical and commercial advantages, examples of which are discussed herein. The rib described herein provides discrete regions of varying thickness and optimized filleting to reduce stress near turns between channels on either side of the rib. More particularly, the rib includes a complex fillet shape along a turn thereof that separates two internal channels that reduces stress in the airfoil and increases the lifespan of the turbine blade, rotor blade section and/or turbine in which used.

While the apparatus and devices of the present disclosure are contemplated for use in a heavy-duty turbomachine deployed in a power generation system, rib 260 of the present disclosure may also be used for turbine blades 200 for other systems not described herein that may benefit from the increased stress relief associated with the improved profile of rib portion 280.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and its practical application and to enable others of ordinary skill in the art to understand the disclosure such that various modifications as are suited to a particular use may be further contemplated.

I claim:

1. A turbine blade comprising:

an airfoil having: a suction side, a pressure side opposing the suction side, a leading edge, a trailing edge, and a first rib separating a portion of an internal space defined between the suction and pressure sides and the leading and trailing edges into at least two internal channels; and a platform connected with the airfoil along the suction and pressure sides and the leading and trailing edges, the airfoil and the platform including an origin at a junction of the leading edge of the airfoil and the platform;

wherein a portion of the first rib has a shape having a nominal profile substantially in accordance with Cartesian coordinate values of X, Y and Z set forth in TABLE I, wherein the Cartesian coordinate values are non-dimensional values of from 0% to 100% convertible to distances from the origin by multiplying the values by a height of the airfoil expressed in units of distance, and wherein the Cartesian coordinate values of X, Y and Z are connected by smooth continuing arcs to define the nominal profile of the portion of the first rib.

2. The turbine blade of claim 1, wherein the turbine blade includes a first stage blade.

3. The turbine blade of claim 1, further comprising a fillet connecting a surface of the platform to the airfoil.

4. The turbine blade of claim 1, wherein the portion of the first rib includes a radially outer portion of the first rib positioned radially inward of a radial outer end of the at least two internal channels.

5. The turbine blade of claim 1, wherein the first rib extends from a second rib to an inner surface of a suction sidewall of the airfoil, wherein the second rib further separates the portion of the internal space into the at least two internal channels.

6. A rotor blade section for a turbine, the rotor blade section comprising:

a set of rotating blades, the set of rotating blades including at least one blade having:

an airfoil having: a suction side, a pressure side opposing the suction side, a leading edge, a trailing edge, and a first rib within an internal space defined between the suction and pressure sides and the leading and trailing edges, the first rib separating the internal space into at least two internal channels; and a platform connected with the airfoil along the suction and pressure sides and the leading and trailing edges, the airfoil and the platform including an origin at a junction of the leading edge of the airfoil and the platform;

wherein a portion of the first rib has a shape having a nominal profile substantially in accordance with Cartesian coordinate values of X, Y and Z set forth in TABLE I, wherein the Cartesian coordinate values are non-dimensional values of from 0% to 100% convertible to distances from the origin by multiplying the values by a height of the airfoil expressed in units of distance, and wherein the Cartesian coordinate values of X, Y, and Z are connected by smooth continuing arcs to define the nominal profile of the portion of the first rib.

7. The rotor blade section of claim 6, further comprising a fillet connecting a surface of the platform to the airfoil.

8. The rotor blade section of claim 6, wherein the rotor blade section is a first stage blade section.

9. The rotor blade section of claim 6, wherein the portion of the first rib includes a radially outer portion of the first rib positioned radially inward of a radial outer end of the at least two internal channels.

10. The rotor blade section of claim 6, wherein the first rib extends from a second rib to an inner surface of a suction sidewall of the airfoil, wherein the second rib further separates the portion of the internal space into the at least two internal channels.

11. A turbine comprising a plurality of turbine blades in a rotor blade section, at least one of the plurality of turbine blades comprising:

an airfoil having: a suction side, a pressure side opposing the suction side, a leading edge, a trailing edge, and a first rib separating a portion of an internal space defined between the suction and pressure sides and the leading and trailing edges into at least two internal channels; and a platform connected with the airfoil along the suction and pressure sides and the leading and trailing edges, the airfoil and the platform including an origin at a junction of the leading edge of the airfoil and the platform;

wherein a portion of the first rib has a shape having a nominal profile substantially in accordance with Cartesian coordinate values of X, Y and Z set forth in TABLE I, wherein the Cartesian coordinate values are non-dimensional values of from 0% to 100% convertible to distances from the origin by multiplying the values by a height of the airfoil expressed in units of distance, and wherein the Cartesian coordinate values of X, Y, and Z are connected by smooth continuing arcs to define the nominal profile of the portion of the first rib.

12. The turbine of claim 11, further comprising a fillet connecting a surface of the platform to the airfoil.

13. The turbine of claim 11, wherein each turbine blade includes a first stage blade.

14. The turbine of claim 11, wherein the portion of the first rib includes a radially outer portion of the first rib positioned radially inward of a radial outer end of the at least two internal channels.

15. The turbine of claim 11, wherein the first rib extends from a second rib to an inner surface of a suction sidewall of the airfoil, wherein the second rib further separates the portion of the internal space into the at least two internal channels.

* * * * *